US011294589B2

(12) United States Patent
Cheng

(10) Patent No.: US 11,294,589 B2
(45) Date of Patent: Apr. 5, 2022

(54) METHOD FOR PERFORMING ACCESS CONTROL IN A MEMORY DEVICE, ASSOCIATED MEMORY DEVICE AND CONTROLLER THEREOF

(71) Applicant: Silicon Motion, Inc., Hsinchu County (TW)

(72) Inventor: Chiao-Wen Cheng, Taichung (TW)

(73) Assignee: Silicon Motion, Inc., Hsinchu County (TW)

( * ) Notice: Subject to any disclaimer, the term of this patent is extended or adjusted under 35 U.S.C. 154(b) by 157 days.

(21) Appl. No.: 16/882,539

(22) Filed: May 24, 2020

(65) Prior Publication Data

US 2020/0285411 A1 Sep. 10, 2020

Related U.S. Application Data

(63) Continuation of application No. 16/120,311, filed on Sep. 3, 2018, now Pat. No. 10,705,749.

(30) Foreign Application Priority Data

Nov. 30, 2017 (TW) .................................. 106141791

(51) Int. Cl.
*G06F 3/06* (2006.01)
*G06F 11/10* (2006.01)
(52) U.S. Cl.
CPC .......... *G06F 3/0644* (2013.01); *G06F 3/0619* (2013.01); *G06F 3/0689* (2013.01); *G06F 11/1076* (2013.01); *G06F 3/0656* (2013.01)

(58) Field of Classification Search
CPC ........... G06F 3/0644; G06F 2003/0691; G06F 3/0689
See application file for complete search history.

(56) References Cited

U.S. PATENT DOCUMENTS 5,446,855 A 8/1995 Dang
5,737,744 A 4/1998 Callison
(Continued)

FOREIGN PATENT DOCUMENTS

CN 103631671 A 3/2014
CN 104881244 A 9/2015
(Continued)

*Primary Examiner* — Joseph D Torres
(74) *Attorney, Agent, or Firm* — Winston Hsu

(57) ABSTRACT

A method for performing access control in a memory device, the associated memory device and the controller thereof are provided. The method includes: according to at least one predetermined arrangement pattern, writing a plurality of sets of symbols into a plurality of storage regions of a memory as a plurality of redundant array of independent disks (RAID) groups, respectively; and utilizing a RAID engine circuit in the memory device to perform a plurality of operations related to data protection, such as: determining a series of reading patterns corresponding to the predetermined arrangement pattern; according to a reading pattern of the series of reading patterns, reading a plurality of symbols from each RAID group of the RAID groups; and performing exclusive-OR (XOR) operations on the symbols to convert the symbols into at least one XOR result, for performing data protection.

15 Claims, 12 Drawing Sheets

(56) References Cited

U.S. PATENT DOCUMENTS

| | | | |
|---|---|---|---|
| 5,893,138 A | 4/1999 | Judd | |
| 6,223,301 B1 | 4/2001 | Santeler | |
| 6,341,342 B1* | 1/2002 | Thompson | G06F 3/0613 |
| | | | 707/999.202 |
| 6,460,122 B1* | 10/2002 | Otterness | G06F 11/1076 |
| | | | 711/122 |
| 8,161,353 B2 | 4/2012 | Flynn | |
| 8,886,881 B2 | 11/2014 | Bakke | |
| 8,959,420 B1* | 2/2015 | Piszczek | G06F 11/1096 |
| | | | 714/801 |
| 9,052,826 B2 | 6/2015 | Quan | |
| 9,639,457 B1 | 5/2017 | Piszczek | |
| 9,830,220 B1 | 11/2017 | Harvey | |
| 10,185,624 B2 | 1/2019 | Akutsu | |
| 2006/0047908 A1 | 3/2006 | Chikusa | |
| 2006/0123271 A1 | 6/2006 | Forhan | |
| 2008/0109602 A1 | 5/2008 | Ananthamurthy | |
| 2009/0222509 A1 | 9/2009 | King | |
| 2010/0306466 A1 | 12/2010 | Li | |
| 2011/0078496 A1 | 3/2011 | Jeddeloh | |
| 2012/0072680 A1* | 3/2012 | Kimura | G06F 11/108 |
| | | | 711/154 |
| 2012/0110377 A1* | 5/2012 | Sundrani | G06F 11/1076 |
| | | | 714/6.22 |
| 2012/0151124 A1* | 6/2012 | Baek | G06F 12/0246 |
| | | | 711/103 |
| 2012/0233406 A1* | 9/2012 | Igashira | G06F 12/0866 |
| | | | 711/118 |
| 2013/0055012 A1 | 2/2013 | Roh | |
| 2014/0298138 A1 | 10/2014 | Gladwin | |
| 2014/0317340 A1 | 10/2014 | Nishina | |
| 2015/0089328 A1 | 3/2015 | Lee | |
| 2016/0246678 A1 | 8/2016 | Galbraith | |
| 2016/0357649 A1 | 12/2016 | Karrotu | |
| 2017/0091022 A1* | 3/2017 | Khan | G06F 3/0688 |
| 2017/0115900 A1 | 4/2017 | Camp | |
| 2017/0255517 A1* | 9/2017 | Achtenberg | G06F 3/0619 |
| 2019/0065306 A1* | 2/2019 | Margetts | G06F 11/1068 |

FOREIGN PATENT DOCUMENTS

| | | |
|---|---|---|
| EP | 0 521 630 A2 | 1/1993 |
| EP | 2 921 960 A2 | 9/2015 |
| KR | 97-49546 A | 7/1997 |
| TW | 200502765 | 1/2005 |
| TW | 201312355 A1 | 3/2013 |
| TW | 201445429 A | 12/2014 |
| TW | 201601160 A | 1/2016 |
| TW | 201738892 A | 11/2017 |
| TW | I656442 B | 4/2019 |

* cited by examiner

METHOD FOR PERFORMING ACCESS CONTROL IN A MEMORY DEVICE, ASSOCIATED MEMORY DEVICE AND CONTROLLER THEREOF

CROSS REFERENCE TO RELATED APPLICATIONS

This application is a continuation application and claims the benefit of U.S. Non-provisional application Ser. No. 16/120,311, which was filed on Sep. 3, 2018, and is included herein by reference.

BACKGROUND OF THE INVENTION

1. Field of the Invention

The present invention relates to access control of flash memories, and more particularly, to a method for performing access control in a memory device, the associated memory device and controller thereof.

2. Description of the Prior Art

Developments in memory technology have enabled the wide application of portable memory devices, such as memory cards conforming to SD/MMC, CF, MS and XD specifications, solid state drives, or embedded storage devices conforming to the UFS and EMMC specifications. Improving access control of memories in these portable memory devices remains an issue to be solved in the art, however.

NAND flash memories may comprise single level cell (SLC) and multiple level cell (MLC) flash memories. In an SLC flash memory, each transistor used as a memory cell may have either of two electrical charge values respectively corresponding to logic values 0 and 1. In comparison, the storage ability of each transistor used as a memory cell in an MLC flash memory may be fully utilized. The transistors are driven by a voltage higher than that in the SLC flash memory, and different voltage levels are utilized to record information of at least two bits (such as 00, 01, 11, or 10). In theory, the recording density of the MLC flash memory may reach at least twice the recording density of the SLC flash memory, and is therefore preferred by manufacturers of NAND flash memories.

The lower cost and larger capacity of the MLC flash memory means it is more likely to be applied in portable memory devices than an SLC flash memory. The MLC flash memory does have instability issues, however. To ensure that access control of the flash memory in the portable memory device meets required specifications, a controller of the flash memory is configured to apply management mechanisms for properly managing data access.

Memory devices inevitably have certain deficiencies, even those with the above management mechanism. For example, a hardware mechanism designed in response to some types of data protection requirements can be very complicated. In another example, massive data accessing designed in response to some types of data protection requirements may lower the overall efficiency of memory devices. Hence, there is a need for a novel method and memory access mechanism of memory devices which can achieve optimal performance without introducing side effects or in a way that is less likely to introduce side effects.

SUMMARY OF THE INVENTION

One of the objectives of the present invention is to provide a method for performing access control in a memory device, the associated memory device and controller thereof, in order to solve the above issues.

Another objective of the present invention is to provide a method for performing access control in a memory device, the associated memory device and controller thereof, in order to achieve optimal performance of the memory device without introducing side effects or in a way that is less likely to introduce side effects.

At least one embodiment of the present invention provides a method for performing access control in a memory device. The memory device comprises a non-volatile (NV) memory comprising at least one NV memory element. The method comprises: according to at least one predetermined arrangement pattern, writing a plurality of sets of symbols into a plurality of storage regions of a memory as a plurality of redundant array of independent disks (RAID) groups, respectively, in order to provide data protection for accessing the NV memory, wherein the memory is a volatile memory and is located in the memory device; utilizing a RAID engine circuit in the memory device to determine a series of reading patterns corresponding to the at least one predetermined arrangement pattern, wherein the memory is arranged to provide storage space for the RAID engine circuit; according to a reading pattern of the series of reading patterns, utilizing the RAID engine circuit to read a plurality of symbols from each RAID group of the RAID groups; and utilizing the RAID engine circuit to perform exclusive-OR (XOR) operations on the symbols, in order to convert the symbols into at least one XOR result corresponding to the RAID group, wherein the at least one XOR result is arranged to perform data protection.

At least one embodiment of the present invention provides a memory device which comprises an NV memory and a controller. The NV memory is arranged to store information, wherein the NV memory comprises at least one NV memory element. The controller is coupled to the NV memory, and is arranged to control at least one operation of the memory device. The controller comprises a control logic circuit and a processing circuit. The control logic circuit is coupled to the NV memory, and is arranged to control the NV memory, wherein the control logic circuit comprises a RAID engine circuit and a memory. The RAID engine circuit is arranged to perform data protection, and the memory is arranged to provide storage space for the RAID engine circuit, wherein the memory is a volatile memory. The processing circuit is coupled to the control logic circuit, and is arranged to control the controller according to a command form a host device, allowing the host device to access the NV memory via the controller, wherein under control of the processing circuit, the controller performs the following operations: according to at least one predetermined arrangement pattern, writing a plurality of sets of symbols into a plurality of storage regions of the memory as a plurality of RAID groups, respectively, in order to provide data protection for accessing the NV memory; utilizing the RAID engine circuit to determine a series of reading patterns corresponding to the at least one predetermined arrangement pattern; according to a reading pattern of the series of reading patterns, utilizing the RAID engine circuit to read a plurality of symbols from each RAID group of the RAID groups; and utilizing the RAID engine circuit to perform XOR operations on the symbols, in order to convert the symbols into at least one XOR result corresponding to the RAID group, wherein the at least one XOR result is arranged to perform data protection.

At least one embodiment of the present invention provides a controller of a memory device. The memory device comprises the controller and an NV memory. The NV memory comprises at least one NV memory element, and the controller comprises a control logic circuit coupled to the NV memory, and comprises a processing circuit. The control logic circuit is arranged to control the NV memory, wherein the control logic circuit comprises: a RAID engine circuit arranged to perform data protection, and a memory that is arranged to provide storage space for the RAID engine circuit, wherein the memory is a volatile memory. The processing circuit is coupled to the control logic circuit, and according to a command from a host device, the processing circuit controls the controller in order to allow the host device to access the NV memory via the controller, wherein under control of the processing circuit, the controller performs the following operations: according to at least one predetermined arrangement pattern, writing a plurality of sets of symbols into a plurality of storage regions of the memory as a plurality of RAID groups, respectively, in order to provide data protection for the NV memory; utilizing the RAID engine circuit to determine a series of reading patterns corresponding to the at least one predetermined arrangement pattern; according to a reading pattern of the series of reading patterns, utilizing the RAID engine circuit to read a plurality of symbols from each RAID group of the RAID groups; and utilizing the RAID engine circuit to perform XOR operations on the symbols, in order to convert the symbols into at least one XOR result corresponding to the RAID group, wherein the at least one XOR result is arranged to perform data protection.

An advantage provided by the present invention is that the present invention method and associated apparatus can make the controller properly perform access control when performing data protection, to enhance the performance of the memory device with limited hardware resources. In addition, implementing the embodiments of the present invention will not greatly raise additional costs. Problems existing in the related arts can be solved without greatly increasing the overall cost. The present invention can achieve optimal performance of the memory device without introducing side effects or in a way that is less likely to introduce side effects.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Figure 4:
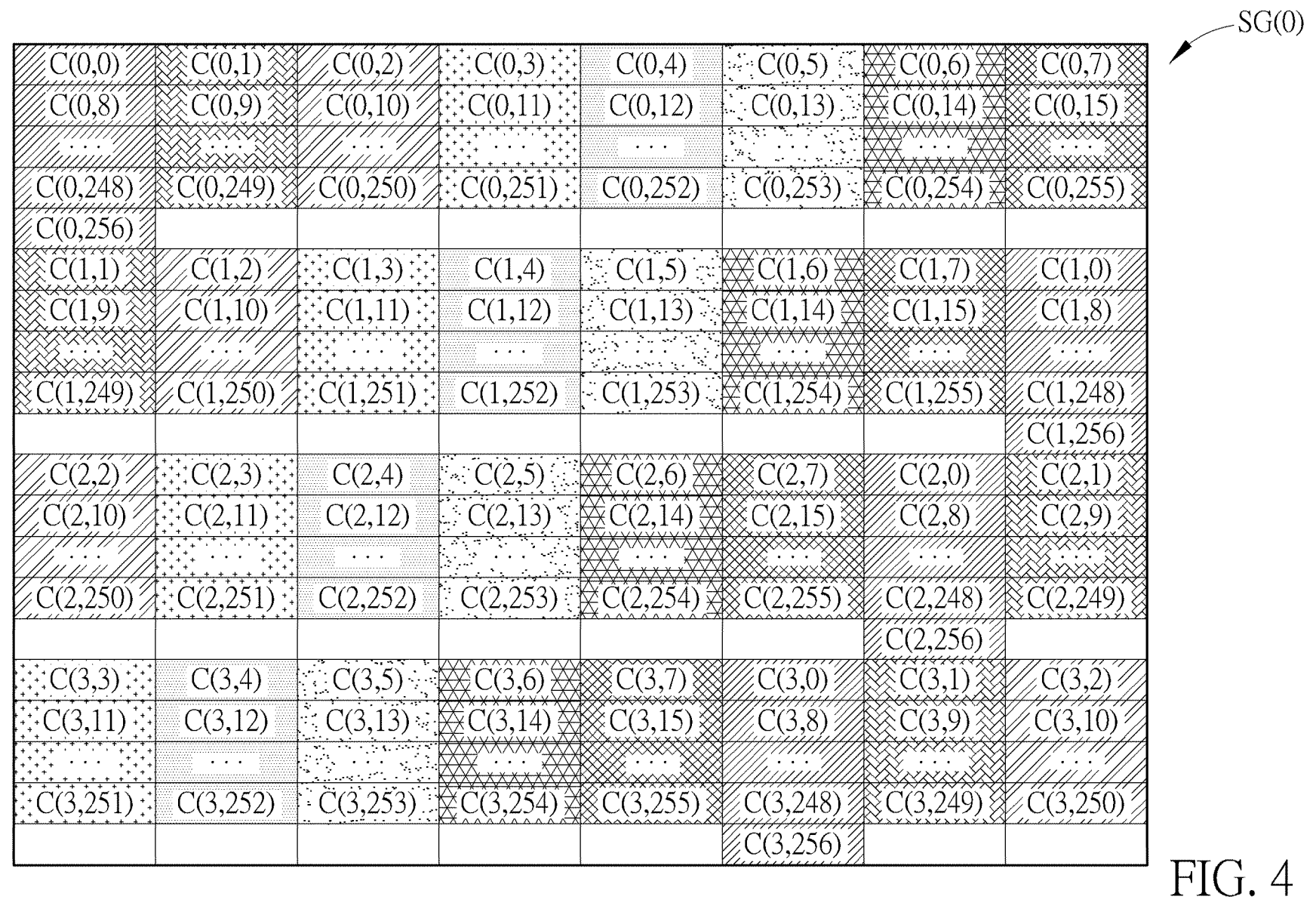

FIG. 4 illustrates a predetermined arrangement pattern of a subgroup of a RAID group utilized in the method according to an embodiment of the present invention.

Figure 5:
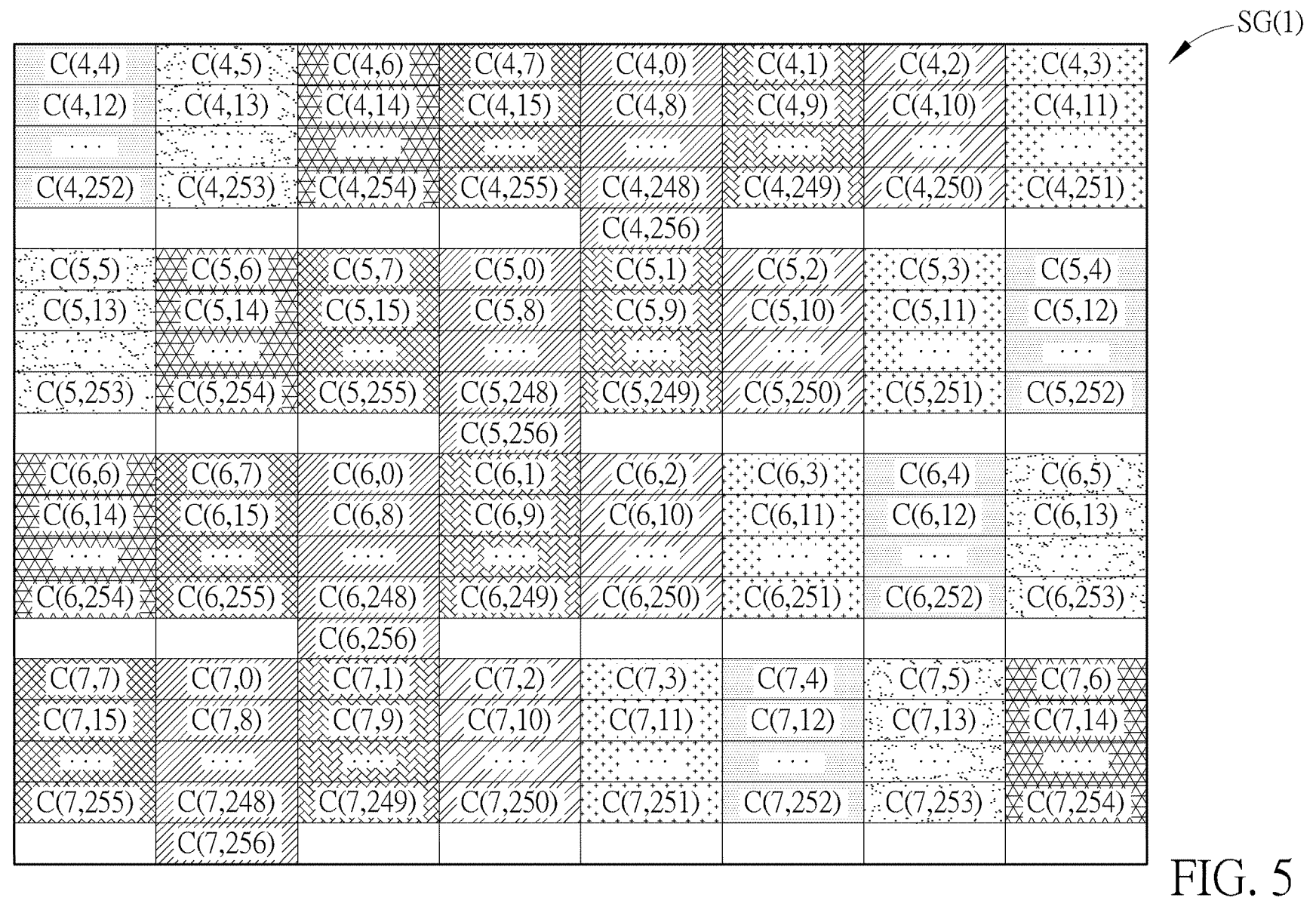

FIG. 5 illustrates a predetermined arrangement pattern of another subgroup of the RAID group.

Figure 6:
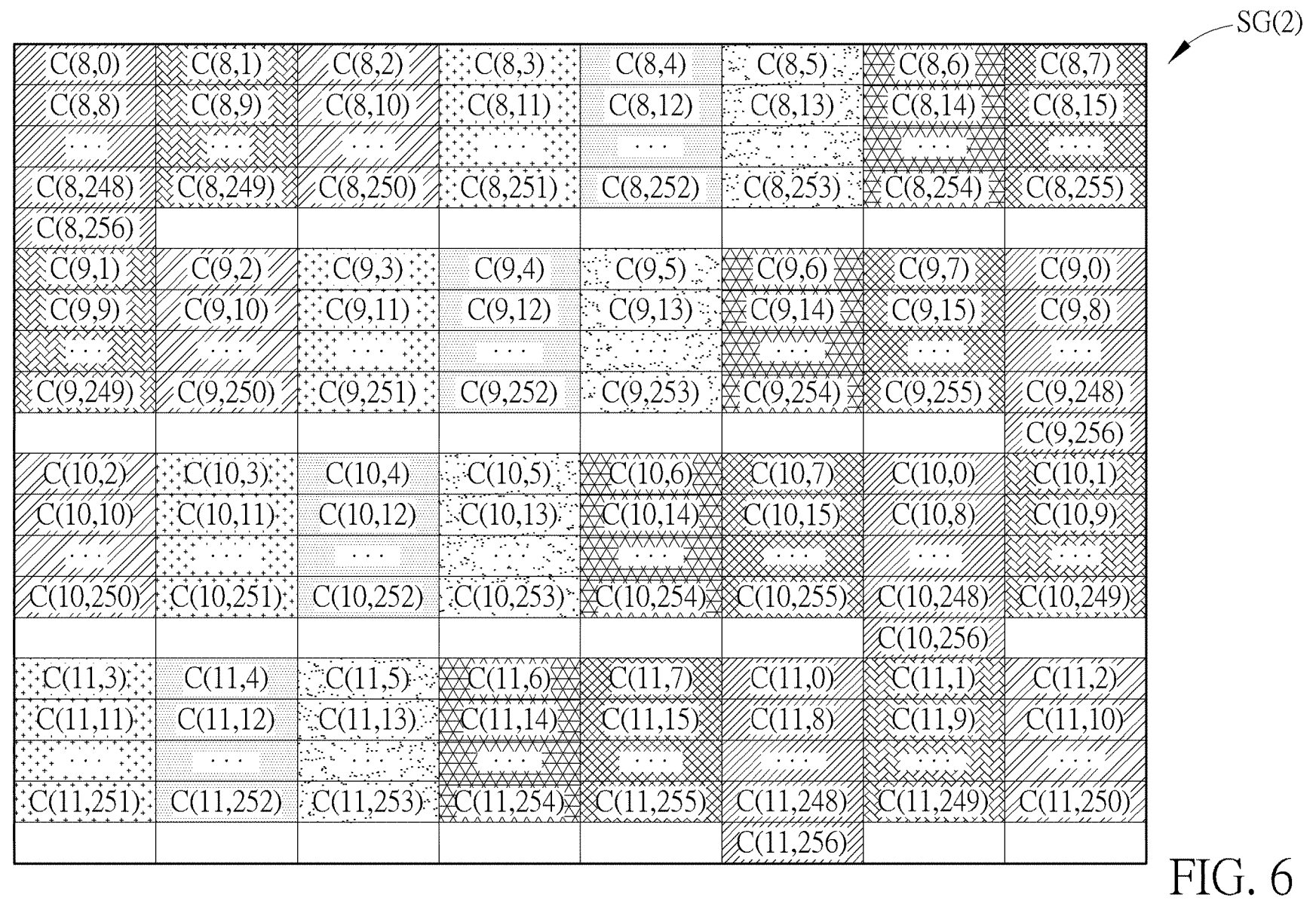

FIG. 6 illustrates a predetermined arrangement pattern of another subgroup of the RAID group.

Figure 7:
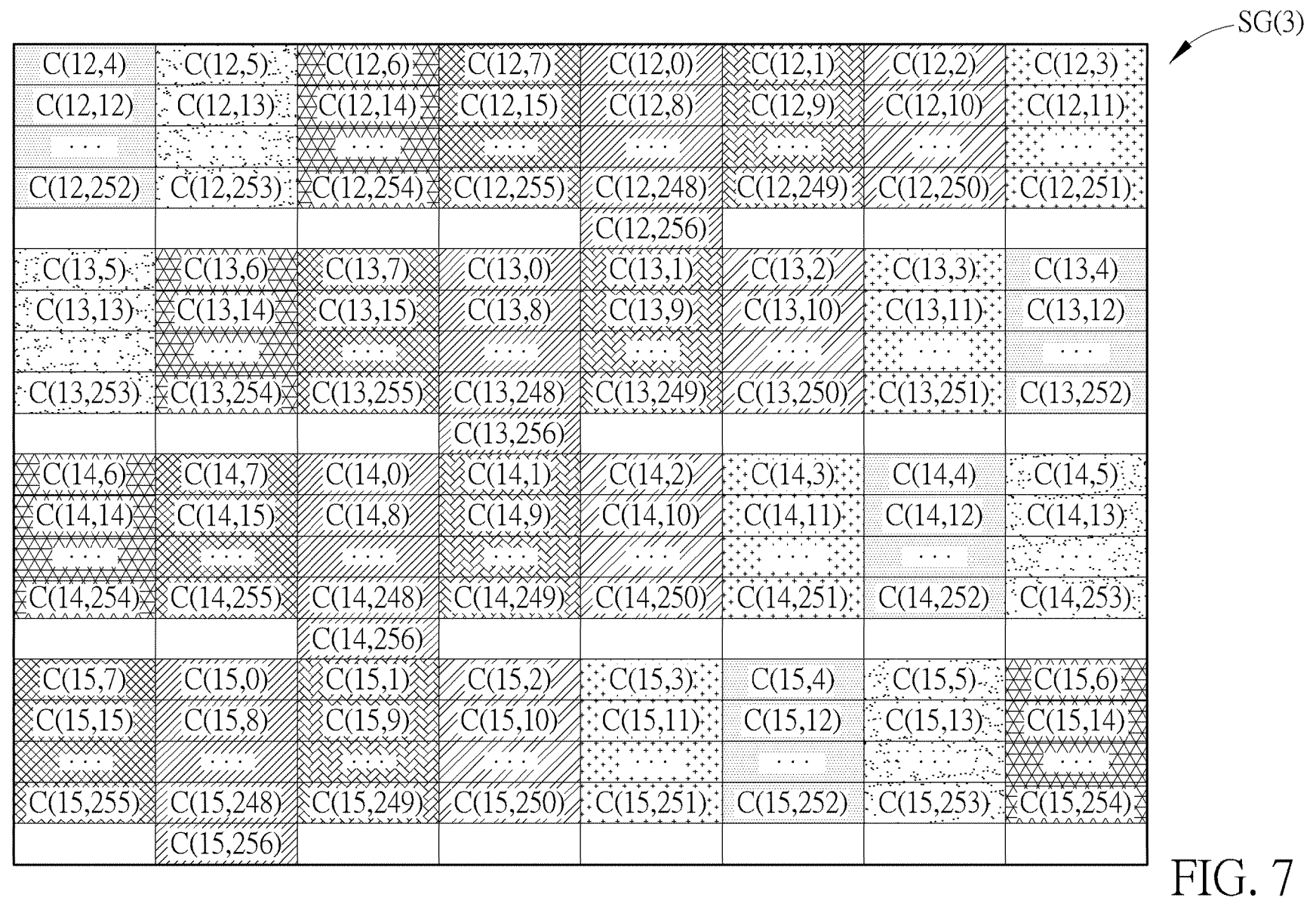

FIG. 7 illustrates a predetermined arrangement pattern of another subgroup of the RAID group.

DETAILED DESCRIPTION

I. Memory System

Figure 1:
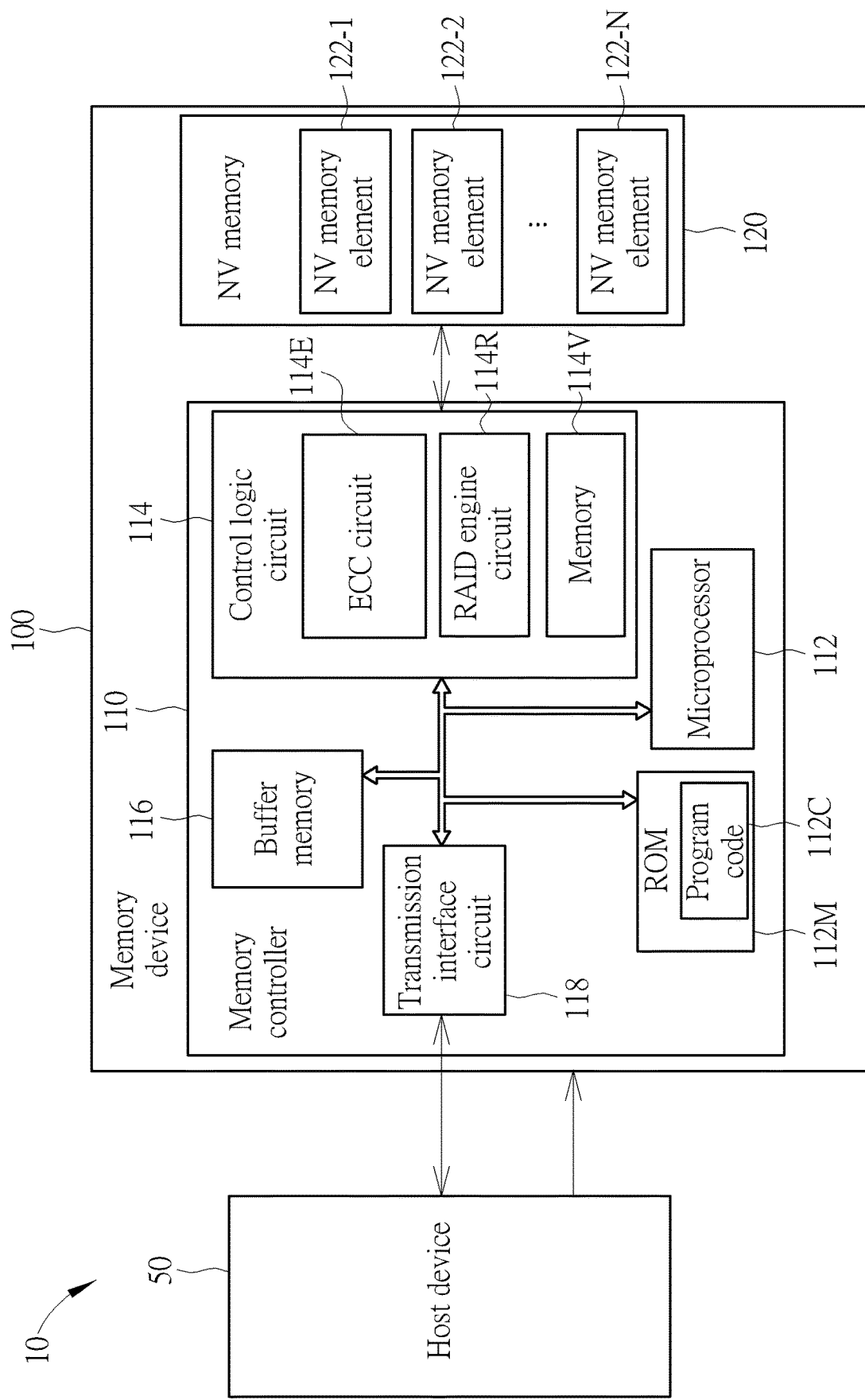
FIG. 1 is a diagram illustrating a memory device and a host device according to an embodiment of the present invention.

Refer to FIG. 1, which is a diagram illustrating a memory device 100 and a host device 50 according to a first embodiment of the present invention, wherein the electronic device 10 may comprise the host device 50 and the memory device 100. Examples of the memory device 100 may comprise (but are not limited to): a portable memory device (e.g. a memory card conforming to the SD/MMC, CF, MS, or XD specification), or a solid state drive (SSD). Further, examples of the host device 50 may comprise (but are not limited to): a multifunctional mobile phone, tablet, wearable device, and personal computer (e.g. a desktop computer or a laptop computer). According to this embodiment, the memory device 100 may comprise a controller such as a memory controller 110, and may further comprise a non-volatile (NV) memory 120, wherein the controller is arranged to access the NV memory 120, and the NV memory 120 is arranged to store information. The NV memory 120 may comprise a plurality of NV memory elements 122-1, 122-2, ..., and 122-N, wherein the symbol "N" may represent an integer larger than 1. For example, the NV memory 120 may be a flash memory, and the NV memory elements 122-1, 122-2, ..., and 122-N may be a plurality of flash memory chips (flash chips) or a plurality of flash memory dies (flash dies), but the present invention is not limited thereto.

As shown in FIG. 1, the memory controller 110 may comprise a processing circuit such as a microprocessor 112, a storage such as a read only memory (ROM) 112M, a control logic circuit 114, a buffer memory 116 and a transmission interface circuit 118, wherein these components may be coupled to one another via a bus. Note that the buffer memory 116 is implemented with a random access memory (RAM), e.g. a Static RAM (SRAM), but the present invention is not limited thereto. The buffer memory 116 may be arranged to provide internal storage space for the memory controller 110, which may temporarily store data. Further, the ROM 112M in this embodiment is arranged to store a program code 112C, and the microprocessor 112 is arranged to execute the program code 112C in order to control the access of the NV memory 120. Note that the program code 112C may also be stored into the buffer memory 116 or any other type of memory. The control logic circuit 114 may be arranged to control the NV memory 120, and may comprise a plurality of sub-circuits, such as an error correction code (ECC) circuit 114E, a redundant array of independent disks (RAID) engine circuit 114R and a memory 114V, in order to simultaneously or non-simultaneously perform a plurality of operations. For example, the ECC 114E may perform ECC encoding/decoding, and may comprise an ECC encoder and an ECC decoder, in order to perform ECC encoding and decoding, respectively. The RAID engine circuit 114R may perform data protection, and may comprise a plurality of RAID engine sub-circuits, in order to perform RAID-related data protection operations, respectively, wherein each of the RAID engine sub-circuits may comprise a plurality of calculation units (e.g. calculation circuits such as adders, multipliers, etc.) and a plurality of logic units (e.g. logic circuits such as logic gates). The memory 114V may provide storage space for the RAID engine circuit 114R, and more particularly, may be used as a dedicated memory of the RAID engine circuit 114R, wherein the memory 114V may be implemented as a volatile memory, such as a static random access memory (Static RAM or SRAM), but the present invention is not limited thereto. The transmission interface circuit 118 may conform to a specific communications specification, such as the Serial Advanced Technology Attachment (SATA) specification, Universal Serial Bus (USB) specification, Peripheral Component Interconnect Express (PCIE) specification, or NV Memory Express (NVME) specification, and may perform communications according to the specific communications specification.

In this embodiment, the host device 50 may indirectly access the NV memory 120 in the memory device 100 by transmitting a plurality of host commands and corresponding logic addresses to the memory controller 110. The memory controller 110 receives the host commands and the logic addresses, and translates the host commands into memory operating commands (which can be called operating commands, for brevity), respectively, and utilizes the operating commands to control the NV memory 120 to read or write/program memory units or data pages of physical addresses in the NV memory 120, wherein a physical address correspond to a logic address. For example, the memory controller 110 may generate or update at least one logical-to-physical address mapping table to manage relationships between the physical addresses and the logic addresses. In the NV memory 120, any NV memory element 122-n within the NV memory elements 122-1, 122-2, . . . and 122-N (wherein the symbol "n" may represent any integer within the interval [1, N]) may comprise a plurality of blocks, and any block of the blocks may comprise and record a certain amount of pages, wherein the smallest unit with which the memory controller 110 performs erasing operations upon the NV memory 120 may be a "block", and the smallest unit with which the memory controller 110 performs writing operations upon the NV memory 120 may be a "page", but the present invention is not limited thereto.

II. Access Control Corresponding to Real-Time Requirements

According to some embodiments, during writing operations, the memory controller 110 may utilize the ECC encoder to perform ECC encoding upon the original data (e.g. user data) in order to protect the original data, and more particularly, may generate a codeword corresponding to the original data, wherein the codeword comprises the original data and a parity-check code thereof. In addition, during reading operations, the memory controller 110 may utilize the ECC decoder to perform ECC decoding upon a readout version of the codeword in order to generate readout data, wherein the ECC decoder may detect any error (if exists) within the readout data, and may attempt to perform error corrections in order to obtain the readout data.

Figure 2:
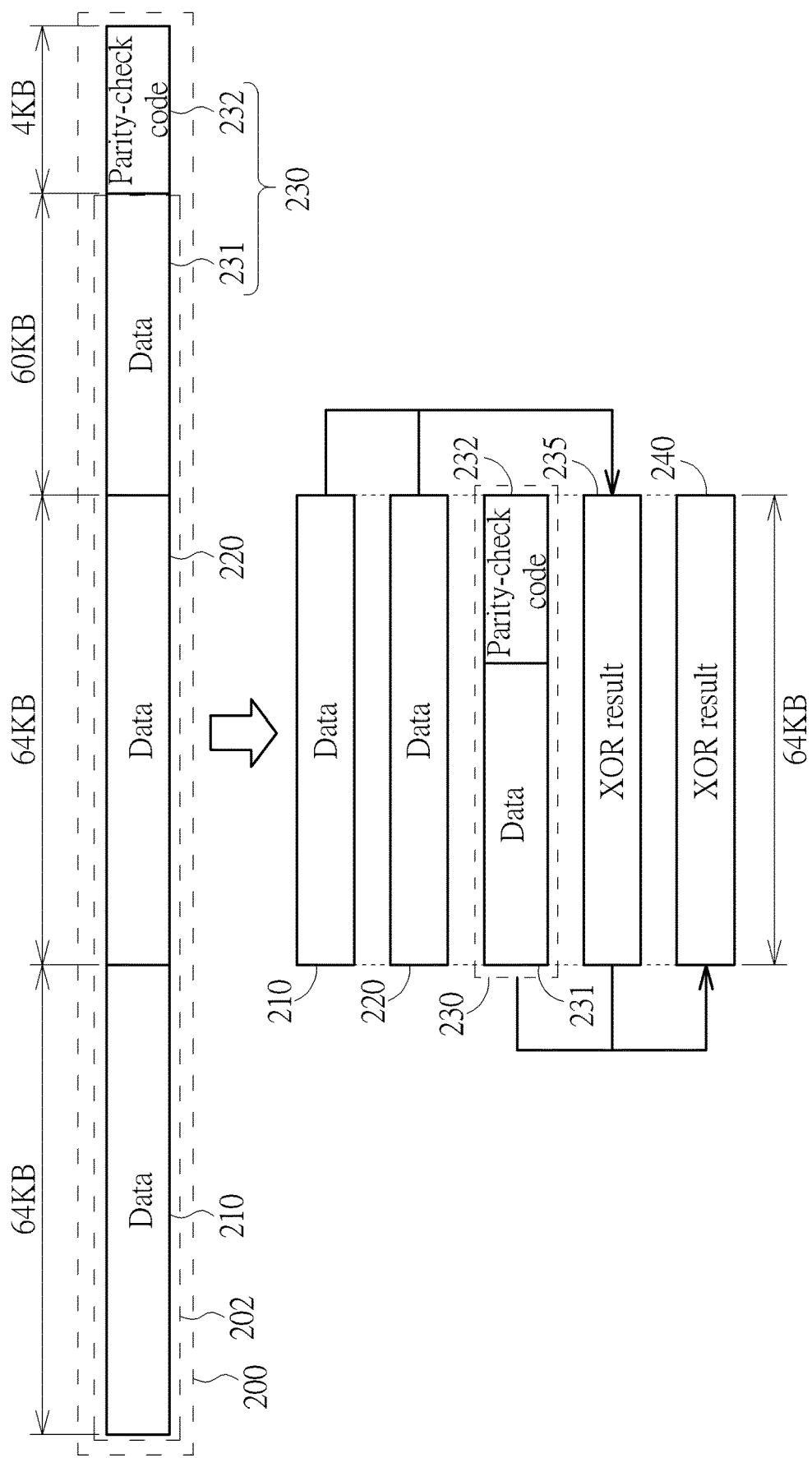
FIG. 2 is a diagram illustrating a data protection scheme of a method for performing access control in a memory device according to an embodiment of the present invention.

FIG. 2 is a diagram illustrating a data protection scheme of a method for performing access control in a memory device according to an embodiment of the present invention. The method may be applied to the memory device 100, and may be applied to the controller such as the memory controller 110. The codeword 200 that comprises the data 202 and the parity-check code 232 may be an example of the codeword. For better understanding, a plurality of subsets of the data 202 may comprise the data 210, 220 and 231, and the combination of the data 231 and the parity-check code 232 may be regarded as the combination data 230. The data amount of each of the data 210, the data 220, and the combination data 230 may be 64 kilobytes (KB), the data amount of the data 231 and parity-check code 232 may be 60 KB and 4 KB, respectively, and the data amount of each of the XOR results 235 and 240 may be 64 KB, but the present invention is not limited thereto. According to this embodiment, during writing operations, the memory controller 110 may utilize the RAID engine circuit 114R (e.g. at least one RAID engine sub-circuit therein) to perform XOR operations upon the data 210 and 220 to generate the XOR result 235, and perform XOR operations upon the combination data 230 and the XOR result 235 to generate the XOR result 240 in order to protect the codeword 200, wherein these XOR operations may be bitwise XOR operations.

For example, the programing fail range of the NV memory 120 may be 64 KB, and the memory 114V may comprise a storage region with a size equal to that of the programing fail range. During programing of the data 210, the RAID engine circuit 114R may temporarily store the data 210 into the storage region. When a failure occurs in the programing of the data 210, the RAID engine circuit 114R may directly program the data 210 in the storage region into the NV memory 120. In addition, during programing of the data 220, the RAID engine circuit 114R may update the data 210 in the storage region into the XOR result 235 in a bit-by-bit manner, to make the contents in the storage region become the XOR result 235. When a programing failure of the data 220 occurs, the RAID engine circuit 114R may perform an XOR operation upon the data 210 and the XOR result 235, and more particularly, may convert the data 210 and the XOR result 235 into the data 220 in a bit-by-bit manner, in order to program the data 220 into the NV memory 120. Further, during programing of the combination data 230, the RAID engine circuit 114R may update the XOR result 235 in the storage region to be the XOR result 240 in a bit-by-bit manner, to make the contents in the storage region become the XOR result 240. When a programing failure of the combination data 230 occurs, the RAID engine circuit 114R may perform XOR operations upon the data 220 and the XOR result 240, and more particularly, may convert the data 220 and the XOR result 240 into the combination data 230 in a bit-by-bit manner, in order to program the combination data 230 into the NV memory 120.

Note that the reading fail range of the NV memory 120 may be different from the programing fail range. For example, the reading fail range of the NV memory 120 may be 4 KB (or other size). Regarding performing data protection upon the codeword 200 via the RAID mechanism, as the reading fail range may be different from the programing fail range (e.g. 4 KB and 64 KB, respectively), their respective data protection requirements for writing/reading may also be different from each other (e.g. the data protections respectively corresponding to 64 KB and 4 KB). The memory controller 110 (e.g. the microprocessor 112 or the RAID engine circuit 114R) may perform access control corresponding to real-time requirements, and more particularly, may dynamically adjust parameter settings of the RAID engine circuit 114R, making the RAID engine circuit 114R have suitable configurations corresponding to current data protection requirements (e.g. data protection requirements corresponding to write or read operations). According to some embodiments, the memory controller 110 (e.g. the microprocessor 112 or the RAID engine circuit 114R) may write a plurality of symbols in at least one codeword (e.g. one or more codewords) into a memory (such as the memory 114V) according to one or more predetermined arrangement patterns, in order to satisfy various types of requirements and/or to conform to various types of configurations, to make the memory controller 110 have excellent performance when performing data protections (e.g. a RAID data protection).

Figure 3:
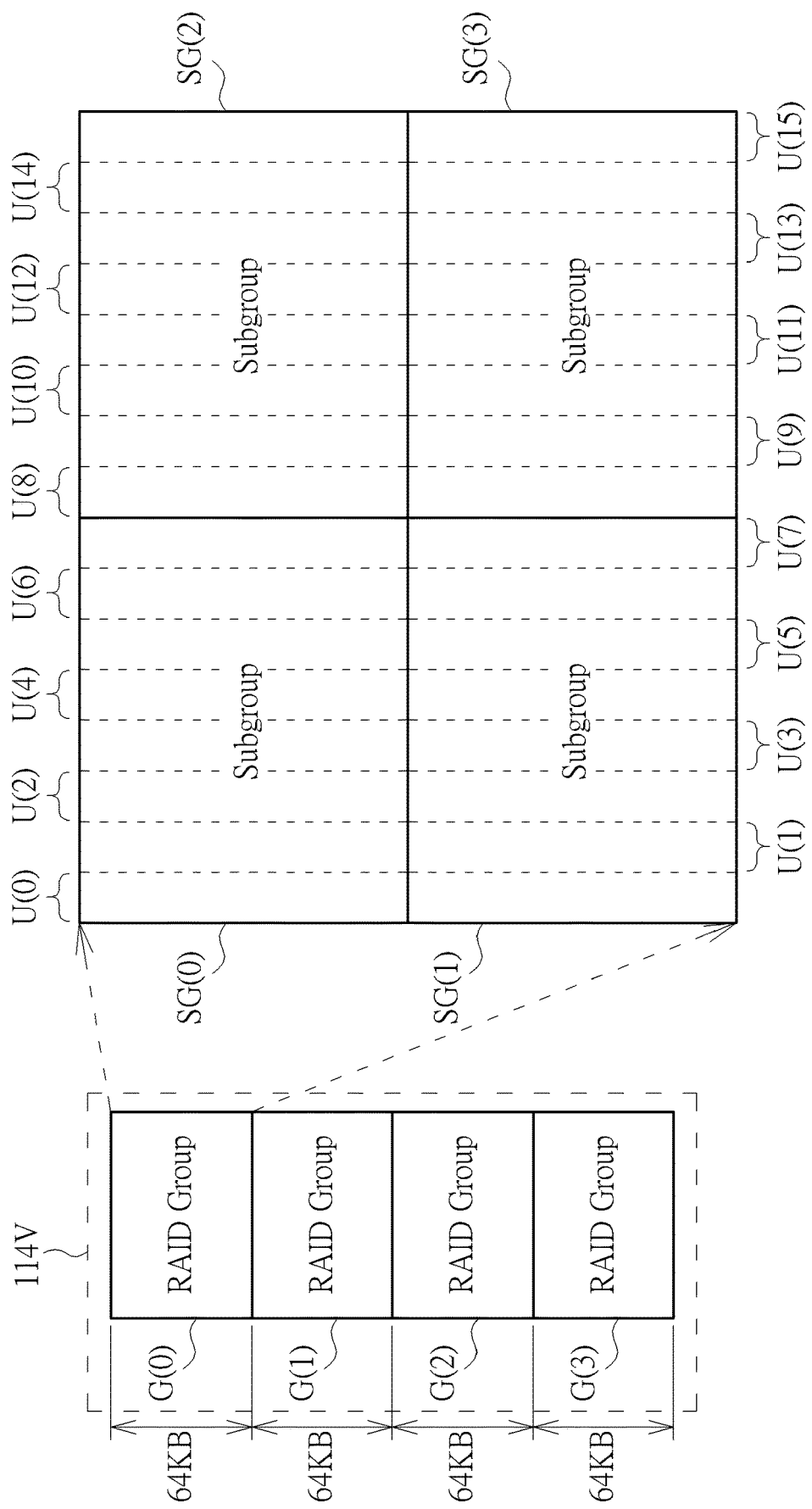
FIG. 3 illustrates a configurable data group management scheme according to an embodiment of the present invention, wherein the data groups of this embodiment may comprise four redundant array of independent disks (RAID) groups.

FIG. 3 illustrates a configurable data group management scheme according to an embodiment of the present invention. For example, the data groups in this embodiment may comprise four RAID groups G(0), G(1), G(2) and G(3), and may be respectively stored in the corresponding data group storage regions within the memory 114V, wherein the data amount of each data group of the RAID groups G(0), G(1), G(2) and G(3) may be exactly or around 64 KB, but the present invention is not limited thereto. The memory 114V may comprise a plurality of memory elements, such as 16 memory access units {U(0), U(1), U(2), U(3), U(4), U(5), U(6), U(7), U(8), U(9), U(10), U(11), U(12), U(13), U(14), U(15)}, which may be accessed simultaneously and in parallel. For better understanding, assume each data group in the RAID groups G(0), G(1), G(2) and G(3) comprises four subgroups, e. g. the RAID group G(0) may comprise subgroups SG(0), SG(1), SG(2) and SG(3), wherein the four subgroups may be equal in size. Based on the one or more predetermined arrangement patterns, the memory controller 110 (e.g. the microprocessor 112 or the RAID engine circuit 114R) may rapidly read different portions of one or more data groups in response to various types of requirements and/or various types of configurations, in order to perform data protection.

FIGS. 4-7 illustrates the respective predetermined arrangement patterns of subgroups SG(0), SG(1), SG(2) and SG(3) of the RAID group G(0) that may be applied to the method according to an embodiment. For example, the group size may be exactly or around 64 KB, and the storage region in the memory 114V may be divided into four sub-regions for storing the RAID groups G(0), G(1), G(2) and G(3), respectively, wherein the predetermined arrangement pattern of any (e.g. each) of the RAID groups G(1), G(2) and G(3) may be similar or equal to the predetermined arrangement pattern of the RAID group G(0). Taking the RAID group G(0) as an example, the symbol C(i, j) with the indexes i and j may represent the jth symbol of the ith chunk within a plurality of data chunks of the RAID group G(0), and the blank portion may represent "Don't Care". As shown in FIGS. 4-7, examples of the symbol C(i, j) may comprise (but are not limited to): {{C(0, 0), C(0, 1), ..., C(0, 256)}, {C(1, 0), C(1, 1), ..., C(1, 256)}, {C(2, 0), C(2, 1), ..., C(2, 256)}, {C(3, 0), C(3, 1), ..., C(3, 256)}, {C(4, 0), C(4, 1), ..., C(4, 256)}, {C(5, 0), C(5, 1), ..., C(5, 256)}, {C(6, 0), C(6, 1), ..., C(6, 256)}, {C(7, 0), C(7, 1), ..., C(7, 256)}, {C(8, 0), C(8, 1), ..., C(8, 256)}, {C(9, 0), C(9, 1), ..., C(9, 256)}, {C(10, 0), C(10, 1), ..., C(10, 256)}, {C(11 0), C(11, 1), ..., C(11, 256)}, {C(12, 0), C(12, 1), ..., C(12, 256)}, {C(13, 0), C(13, 1), ..., C(13, 256)}, {C(14, 0), C(14, 1), ..., C(14, 256)}, {C(15, 0), C(15, 1), ..., C(15, 256)}};

wherein the index i may be any integer within the interval [0, 15], and the index j may be any integer within the interval [0, 256], but the present invention is not limited thereto. According to some embodiments, the ranges of the index i and/or the index j may vary. In addition, the various types of shaded areas shown in FIGS. 4-7 may indicate the trend of symbol arrangement in the predetermined arrangement patterns, but the present invention is not limited thereto. According to some embodiments, the predetermined arrangement patterns shown in FIGS. 4-7 may vary.

TABLE 1

| EncGrpSize | Group Size | Group Index | Refold ratio |
|---|---|---|---|
| D0 | 1 chunk | 0, 1, 2, 3, 4, ..., 63 | 1 |
| D1 | 2 chunks | 0, 1, 2, 3, 4, ..., 31 | 1, 2 |
| D2 | 4 chunks | 0, 1, 2, 3, 4, ..., 15 | 1, 2, 4 |
| D3 | 8 chunks | 0, 1, 2, 3, 4, ..., 7 | 1, 2, 4, 8 |
| D4 | 16 chunks | 0, 1, 2, 3 | 1, 2, 4, 8, 16 |

Table 1 illustrates examples of associated parameters of the RAID engine circuit 114R, but the present invention is not limited thereto. The memory controller 110 may set the parameter EncGrpSize (e.g. setting it to be one of predetermined values {D0, D1, D2, D3, D4}) to control the configuration of the RAID engine circuit 114R, and may control the RAID engine circuit 114R through the parameter EncGrpSize to perform data protection operations corresponding to the parameter EncGrpSize. For example, when EncGrpSize=D0, the group size of a data group (e.g. a RAID group) may be equal to the size of one chunk (e.g. the zero-th chuck {C(0, 0), C(0, 1), ..., C(0, 256)} of the data chunks), the group index may be any integer within the interval [0, 63], and the refold ratio may be equal to 1; when EncGrpSize=D1, the group size of a data group (e.g. RAID group) may be equal to the size of two chunks (e.g. the zero-th chunk {C(0, 0), C(0, 1), ..., C(0, 256)} and the first chunk {C(1, 0), C(1, 1), ..., C(1, 256)}), wherein the group index may be any integer within the interval [0, 31], and the refold ratio may be 1 or 2; and so forth for other EncGrpSize values.

According to some embodiments, examples of the range of the indexes i and j of the symbol C(i, j) in a data group (e.g. any of the RAID groups G(0), G(1), G(2) and G(3), such as the RAID group G(0)) may comprise (but are not limited to):

(1a). when EncGrpSize=D4, the index i may be any integer within the interval [0, 15], and the index j may be any integer within the interval [0, 256], as shown in FIGS. 4-7;

(1b). when EncGrpSize=D3, the index i may be any integer within the interval [0, 7], and the index j may be any integer within the interval [0, 256], as shown in FIGS. 4-5;

(1c). when EncGrpSize=D2, the index i may be any integer within the interval [0, 3], and the index j may be any integer within the interval [0, 256], as shown in FIG. 4;

(1d). when EncGrpSize=D1, the index i may be any integer within the interval [0, 1], and the index j may be any integer within the interval [0, 256], wherein symbols having an index outside the above interval thereof may be omitted in FIG. 4.

(1e). when EncGrpSize=D0, the index i may be equal to 0, and the index j may be any integer within the interval [0, 256], wherein symbols having an index not within the above interval or range thereof will be omitted in FIG. 4;

(2a). when EncGrpSize=D4, the index i may be any integer within the interval within [0, 15], and the index j may be any integer within the interval [0, 255], wherein symbols having an index not within the above interval thereof will be omitted in FIGS. 4-7;

(2b). when EncGrpSize=D3, the index i may be any integer within the interval [0, 7], and the index j may be any integer within the interval [0, 255], wherein symbols having an index not within the above interval thereof will be omitted in FIGS. 4-5;

(2c). when EncGrpSize=D2, the index i may be any integer within the interval [0, 3], and the index j may be any integer within the interval [0, 255], wherein symbols having an index not within the above interval thereof will be omitted in FIG. 4;

(2d). when EncGrpSize=D1, the index i may be any integer within the interval [0, 1], and the index j may be any integer within the interval [0, 255], wherein symbols having an index not within the above interval thereof will be omitted in FIG. 4; and (2e). when EncGrpSize=D0, the index i may be equal to 0, and the index j may be any integer within the interval [0, 255], wherein symbols having an index not within the above interval or range thereof will be omitted in FIG. 4.

Figure 8:
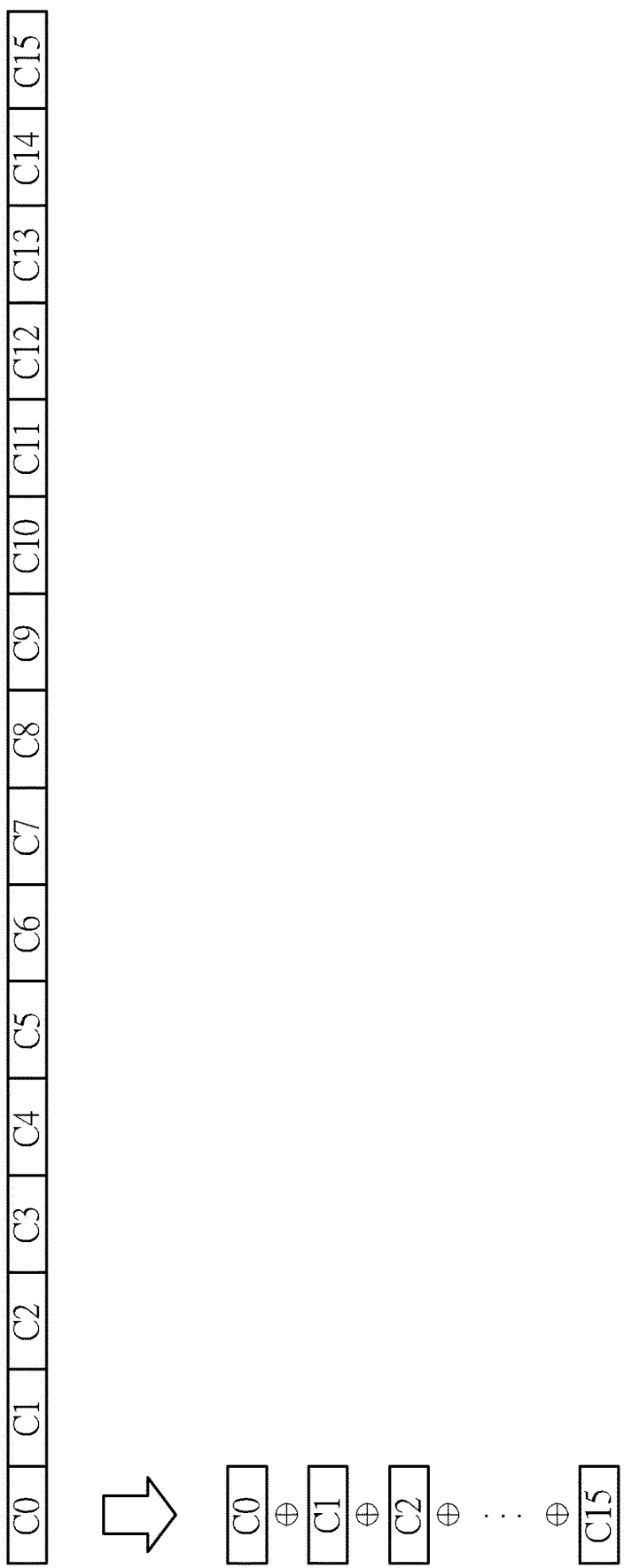
FIG. 8 illustrates a configurable exclusive-OR (XOR) control scheme of the method shown in FIG. 2 according to an embodiment of the present invention.

FIG. 8 illustrates a configurable exclusive-OR (XOR) control scheme of the method shown in FIG. 2 according to an embodiment of the present invention. When adopting the configurable data group management scheme shown in FIG. 3, the memory controller 110 may also adopt the configurable XOR control scheme shown in FIG. 8. Assuming that the refold ratio is 16, and the 16 memory access units {U(0), U(1), U(2), U(3), U(4), U(5), U(6), U(7), U(8), U(9), U(10), U(11), U(12), U(13), U(14), U(15)} are read simultaneously, the memory controller 110 (e.g. the microprocessor 112) may utilize the RAID engine circuit 114R to simultaneously read a plurality of symbols (e.g. 16 in total) as the symbols {C(0), C(1), C(2), C(3), C(4), C(5), C(6), C(7), C(8), C(9), C(10), C(11), C(12), C(13), C(14), C(15)}, and may immediately perform a bitwise XOR operation upon {C(0), C(1), C(2), C(3), C(4), C(5), C(6), C(7), C(8), C(9), C(10), C(11), C(12), C(13), C(14), C(15)}, in order to perform data protection. For example, during the 0th cycle, the RAID engine circuit 114R may read the symbols {C(0, 0), C(7, 0), C(6, 0), C(5, 0), C(4, 0), C(3, 0), C(2, 0), C(1, 0), C(8, 0), C(15, 0), C(14, 0), C(13, 0), C(12, 0), C(11, 0), C(10, 0), C(9, 0)} as the symbols {C(0), C(1), C(2), C(3), C(4), C(5), C(6), C(7), C(8), C(9), C(10), C(11), C(12), C(13), C(14), C(15)}; during the first cycle, the RAID engine circuit 114R may read the symbols {C(1, 1), C(0, 1), C(7, 1), C(6, 1), C(5, 1), C(4, 1), C(3, 1), C(2, 1), C(9, 1), C(8, 1), C(15, 1), C(14, 1), C(13, 1), C(12, 1), C(11, 1), C(10, 1)} as the symbols {C(0), C(1), C(2), C(3), C(4), C(5), C(6), C(7), C(8), C(9), C(10), C(11), C(12), C(13), C(14), C(15)}, and so forth for other cycles. In this way, the reading patterns of the RAID engine circuit 114R in a series of cycles (e.g. the 0th cycle, the first cycle, etc.) may correspond to the predetermined arrangement patterns indicated by various types of shaded areas shown in FIGS. 4-7.

According to some embodiments, the refold ratio may vary, and the number of memory access units that are simultaneously read may also vary. For example, the refold ratio may be equal to 8, and 8 memory access units (such as a portion of the 16 memory access units {U(0), U(1), U(2), U(3), U(4), U(5), U(6), U(7), U(8), U(9), U(10), U(11), U(12), U(13), U(14), U(15)}) may be simultaneously read. The memory controller 110 (e.g. the microprocessor 112) may utilize the RAID engine circuit 114R to simultaneously read the symbols (e.g. 8 in total) as the symbols {C(0), C(1), C(2), C(3), C(4), C(5), C(6), C(7)}, and may immediately perform a bitwise XOR operation upon the symbols {C(0), C(1), C(2), C(3), C(4), C(5), C(6), C(7)}, in order to perform data protection.

Figure 9:
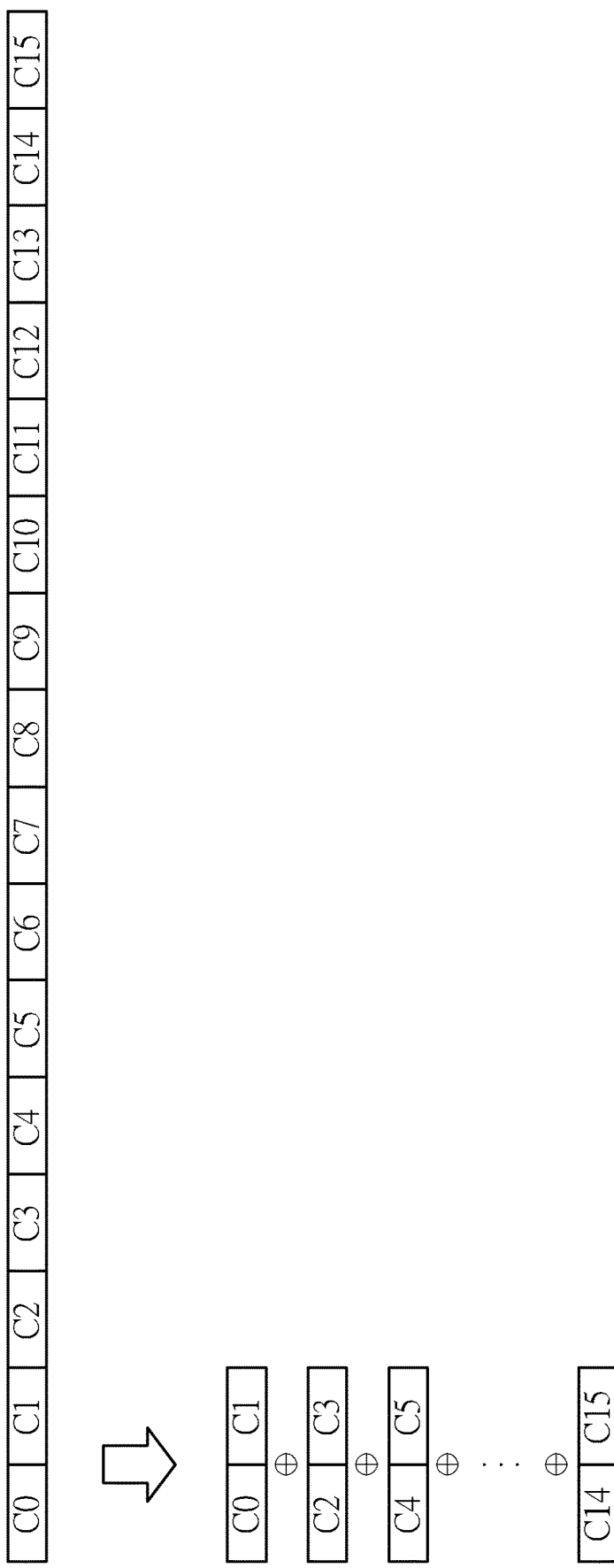
FIG. 9 illustrates a configurable XOR control scheme of the method according to another embodiment of the present invention.

FIG. 9 illustrates a configurable XOR control scheme of the method according to another embodiment of the present invention, wherein when adopting the configurable data group management scheme shown in FIG. 3, the memory controller 110 may also adopt the configurable XOR control scheme shown in FIG. 9. Assume that the refold ratio is 8, and the 8 memory access units (e.g. the memory access units {U(0), U(2), U(4), U(6), U(8), U(10), U(12), U(14)} or the memory access units {U(1), U(3), U(5), U(7), U(9), U(11), U(13), U(15)}) are simultaneously read. The memory controller 110 (e.g. the microprocessor 112) may utilize the RAID engine circuit 114R to simultaneously read the symbols (e.g. 8 in total) as one set of a plurality of sets symbols within the symbols {C(0), C(1), C(2), C(3), C(4), C(5), C(6), C(7), C(8), C(9), C(10), C(11), C(12), C(13), C(14), C(15)}, such as one set of the two sets of symbols {C(0), C(2), C(4), C(6), C(8), C(10), C(12), C(14)} and {C(1), C(3), C(5), C(7), C(9), C(11), C(13), C(15)}, and may immediately perform a bitwise XOR operation upon the symbols {C(0), C(1), C(2), C(3), C(4), C(5), C(6), C(7), C(8), C(9), C(10), C(11), C(12), C(13), C(14), C(15)}, in order to perform data protection. For example, during the 0th cycle, the RAID engine circuit 114R may read symbols {C(0, 0), C(6, 0), C(4, 0), C(2, 0), C(8, 0), C(14, 0), C(12, 0), C(10, 0)} as a first set of symbols such as symbols {C(0), C(2), C(4), C(6), C(8), C(10), C(12), C(14)}, wherein a second set of symbols such as symbols {C(1), C(3), C(5), C(7), C(9), C(11), C(13), C(15)} and the XOR result thereof may be regarded as "Don't care"; during the first cycle, the RAID engine circuit 114R may read symbols {C(0, 1), C(6, 1), C(4, 1), C(2, 1), C(8, 1), C(14, 1), C(12, 1), C(10, 1)} as the second set of symbols such as symbols {C(1), C(3), C(5), C(7), C(9), C(11), C(13), C(15)}, wherein the first set of symbols such as symbols {C(0), C(2), C(4), C(6), C(8), C(10), C(12), C(14)} and the XOR result may be regarded as "Don't care", and so forth for following cycles. In this way, the reading patterns of the RAID engine circuit 114R during a series of cycles (e.g. the 0th cycle, the first cycle, etc.) may correspond to the predetermined arrangement patterns indicated by various types of shaded areas shown in FIGS. 4-7.

Figure 10:
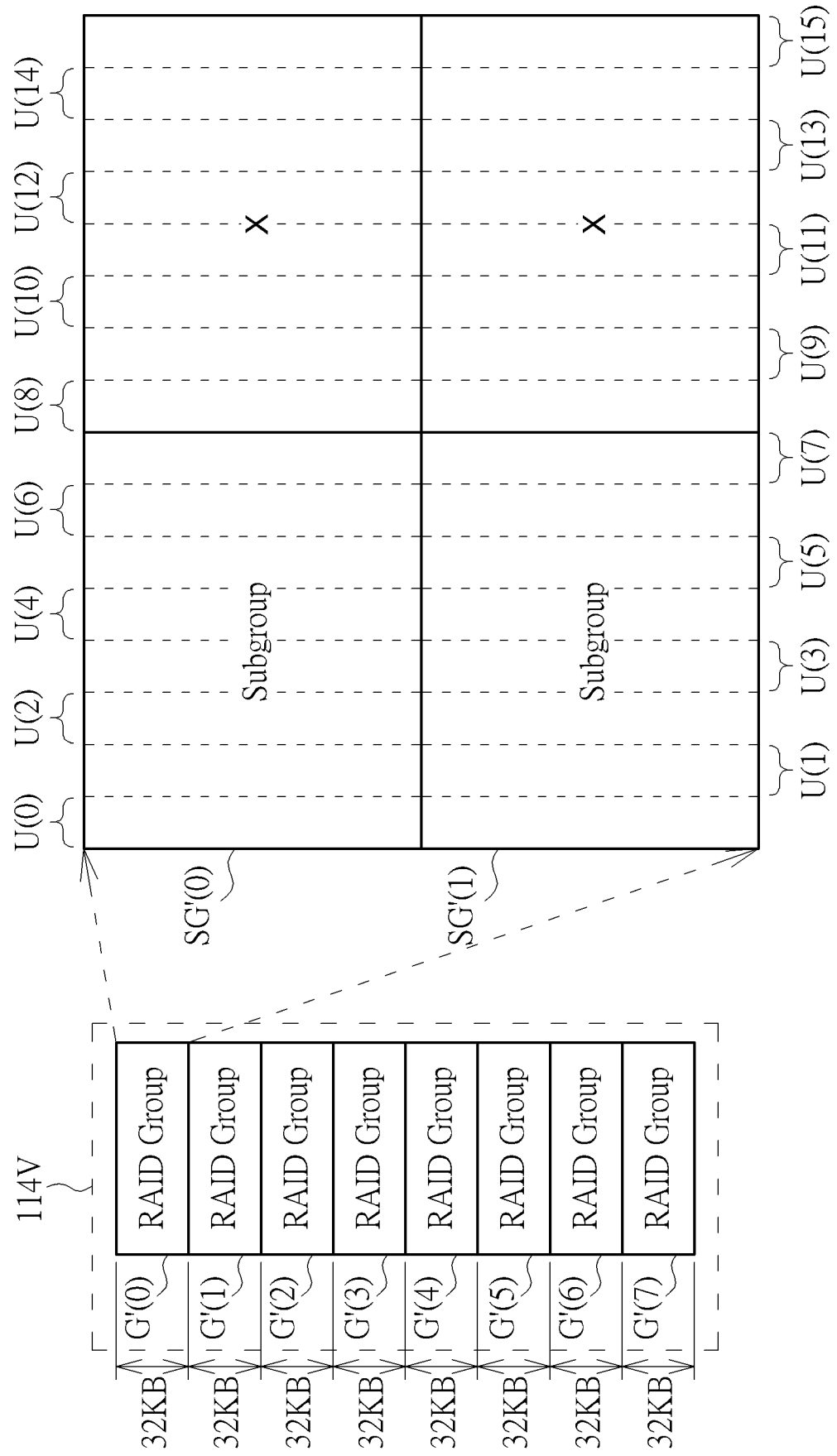
FIG. 10 illustrates a configurable data group management scheme of the method according to another embodiment of the present invention, wherein data groups in this embodiment may comprise eight RAID groups.

FIG. 10 illustrates a configurable data group management scheme of the method according to another embodiment of the present invention. For example, the data groups in this embodiment may comprise 8 RAID groups G' (0), G' (1), G' (2), G' (3), G' (4), G' (5), G' (6) and G' (7), and may be respectively stored in the corresponding data group storage regions within the memory 114V, wherein the data amount of each data group of the RAID groups G' (0), G' (1), G' (2), G' (3), G' (4), G' (5), G' (6) and G' (7) may be exactly or around 32 KB, but the present invention is not limited thereto. For better understanding, each data group in the RAID groups G' (0), G' (1), G' (2), G' (3), G' (4), G' (5), G' (6) and G' (7) is assumed to comprise two subgroups, e. g. the RAID group G' (0) may comprise subgroups SG' (0) and SG' (1), wherein the size of the two subgroups may be identical, and the symbol "X" in FIG. 10 may represent "Don't care". Based on the one or more predetermined arrangement patterns, the memory controller 110 (e.g. the microprocessor 112 or the RAID engine circuit 114R) may rapidly read different portions of one or more data groups in response to various types of requirements and/or various types of configurations, in order to perform data protection.

According to some embodiments, the predetermined arrangement patterns of the subgroup SG' (0) and SG' (1)

may be equal to those of subgroups SG(0) and SG(1), respectively, such as the predetermined arrangement patterns shown in FIG. 4 and FIG. 5. For better understanding, it is assumed that subgroup SG' (0) and SG' (1) are respectively equal to subgroup SG(0) and SG(1). For example, the group size may be exactly or approximately 32 KB, and the entire storage region in the memory 114V may be divided into eight sub-regions for respectively storing the RAID groups G' (0), G' (1), G' (2), G' (3), G' (4), G' (5), G' (6) and G' (7), wherein the predetermined arrangement pattern of any (e.g. each) of the RAID group G' (1), G' (2), G' (3), G' (4), G' (5), G' (6) and G' (7) may be similar or equal to the predetermined arrangement pattern of the RAID group G' (0). Taking the RAID group G' (0) as an example, the symbol $C(i, j)$ with indexes $i$ and $j$ may represent the jth symbol of the ith chunk within a plurality of data chunks of the RAID group G' (0). In these embodiments, examples of the symbol $C(i, j)$ may comprise (but are not limited to): $\{\{C(0, 0), C(0, 1), \ldots, C(0, 256)\}, \{C(1, 0), C(1, 1), \ldots, C(1, 256)\}, \{C(2, 0), C(2, 1), \ldots, C(2, 256)\}, \{C(3, 0), C(3, 1), \ldots, C(3, 256)\}, \{C(4, 0), C(4, 1), \ldots, C(4, 256)\}, \{C(5, 0), C(5, 1), \ldots, C(5, 256)\}, \{C(6, 0), C(6, 1), \ldots, C(6, 256)\}, \{C(7, 0), C(7, 1), \ldots, C(7, 256)\}\}$. Some content relating to these embodiments which is similar to those of previous embodiments is omitted here for brevity.

Figure 11:
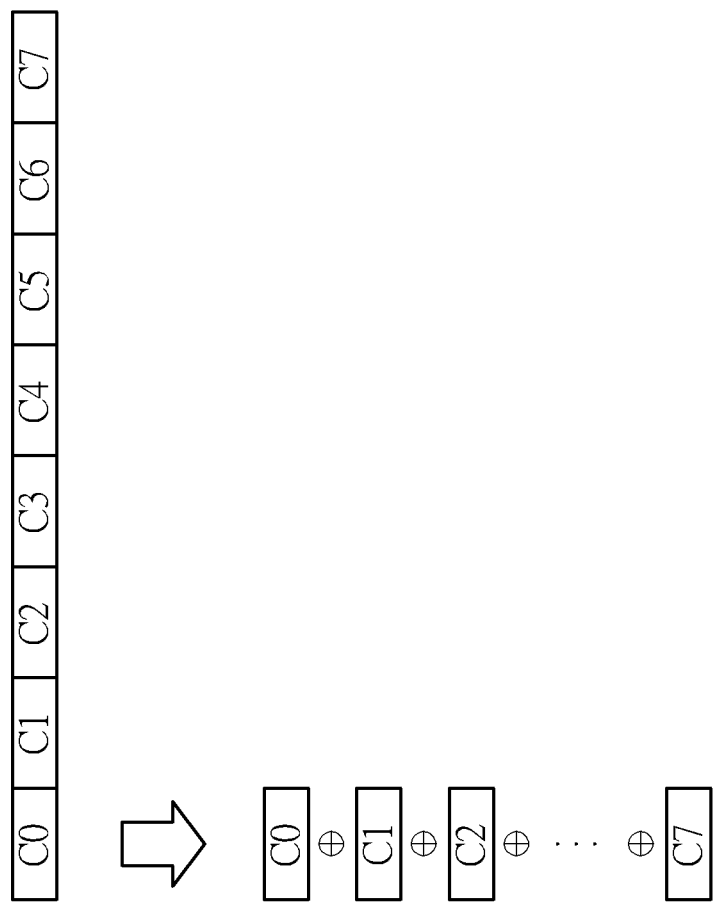
FIG. 11 illustrates a configurable XOR control scheme of the method according to another embodiment of the present invention.

FIG. 11 illustrates a configurable XOR control scheme of the method according to another embodiment of the present invention. When adopting the configurable data group management scheme shown in FIG. 10, the memory controller 110 may also adopt the configurable XOR control scheme shown in FIG. 11. It is assumed that the refold ratio is 8, and 8 memory access units $\{U(0), U(1), U(2), U(3), U(4), U(5), U(6), U(7)\}$ are simultaneously read. The memory controller 110 (e.g. the microprocessor 112) may utilize the RAID engine circuit 114R to simultaneously read the symbols (e.g. 8 in total) as the symbols $\{C(0), C(1), C(2), C(3), C(4), C(5), C(6), C(7)\}$, and may immediately perform a bitwise XOR operation upon the symbols $\{C(0), C(1), C(2), C(3), C(4), C(5), C(6), C(7)\}$, in order to perform data protection. For example, during the 0th cycle, the RAID engine circuit 114R may read symbols $\{C(0, 0), C(7, 0), C(6, 0), C(5, 0), C(4, 0), C(3, 0), C(2, 0), C(1, 0)\}$ as the symbols $\{C(0), C(1), C(2), C(3), C(4), C(5), C(6), C(7)\}$; during the first cycle, the RAID engine circuit 114R may read symbols $\{C(1, 1), C(0, 1), C(7, 1), C(6, 1), C(5, 1), C(4, 1), C(3, 1), C(2, 1)\}$ as the symbols $\{C(0), C(1), C(2), C(3), C(4), C(5), C(6), C(7)\}$, and so forth for other cycles. In this way, the reading patterns of the RAID engine circuit 114R in a series of cycles (e.g. the 0th cycle, the first cycle, etc.) may correspond to the predetermined arrangement patterns as indicated by various types of shaded areas shown in FIGS. 4-5.

Figure 12:
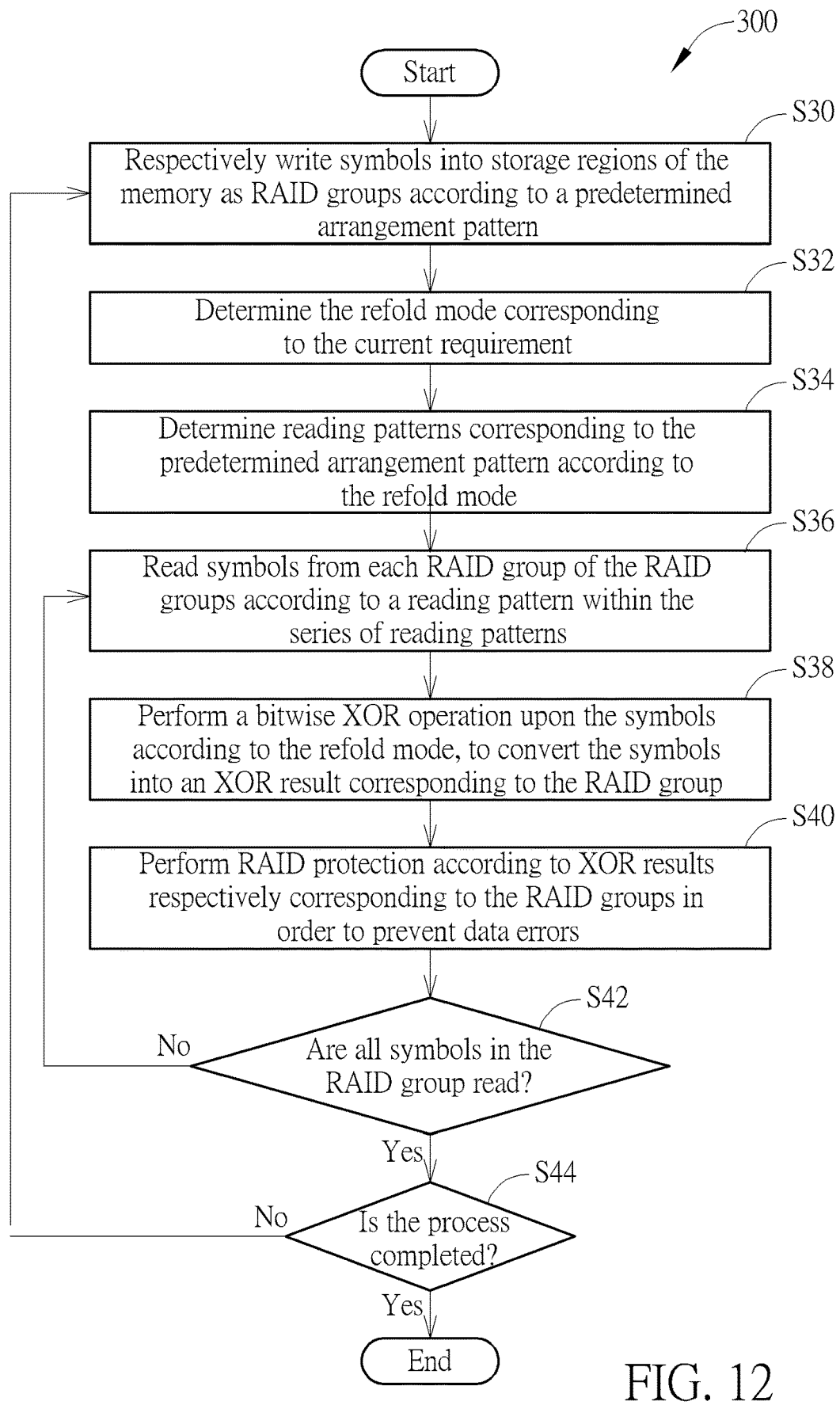
FIG. 12 illustrates a working flow of the method according to an embodiment of the present invention.

FIG. 12 illustrates a working flow 300 of the method according to an embodiment of the present invention. For example, under control of the processing circuit such as the microprocessor 112, the controller such as the memory controller 110 may perform the operations in the working flow 300.

In Step S30, the memory controller 110 (e.g. the microprocessor 112 or the RAID engine circuit 114R) may respectively write a plurality of sets of symbols into a plurality of storage regions (e.g. the above-mentioned data group storage regions) of the memory (e.g. the memory 114V) as a plurality of RAID groups according to at least one predetermined arrangement pattern (e.g. the one or more predetermined arrangement patterns), in order to perform data protection while accessing the NV memory 120. According to this embodiment, the plurality of RAID groups may be the RAID groups represented by a set of group indexes in a specific row of Table 1, wherein the specific row corresponds to a certain predetermined value (e.g. one of the predetermined values {D0, D1, D2, D3, D4}) that is assigned to the parameter EncGrpSize. For example, EncGrpSize may be equal to D4, and the plurality of RAID groups may comprise the above-mentioned four RAID groups G(0), G(1), G(2) and G(3). In another example, EncGrpSize may be equal to D3, and the plurality of RAID groups may comprise the eight RAID groups G'(0), G'(1), G'(2), G'(3), G'(4), G'(5), G'(6) and G'(7).

In Step S32, according to the current requirement (e.g. the data protection requirement corresponding to writing or reading operations), the memory controller 110 (e.g. the RAID engine circuit 114R) may determine the refold mode corresponding to the current requirement, wherein the refold mode is related to data protection operations performed by the RAID engine circuit 114R. According to this embodiment, the refold mode may be a refold ratio in a set of refold ratios of the specific row of Table 1. Since the parameter EncGrpSize has been determined in advance by the memory controller 110 (e.g. the microprocessor 112) and has been transmitted to the RAID engine circuit 114R, the memory controller 110 may utilize the RAID engine circuit 114R to determine the refold mode corresponding to the current requirement, in order to reach optimal access performance. For example, EncGrpSize may be equal to D4, and the refold ratio may be one of the refold ratios {1, 2, 4, 8, 16}. In another example, EncGrpSize may be equal to D3, and the refold ratio may be one of the refold ratios {1, 2, 4, 8}.

In Step S34, the memory controller 110 (e.g. the RAID engine circuit 114R) may determine a series of reading patterns corresponding to the predetermined arrangement pattern according to the refold mode (e.g. any of the modes with different refold ratios). According to this embodiment, the memory controller 110 may utilize the RAID engine circuit 114R to determine the series of reading patterns corresponding to the predetermined arrangement pattern. For example, EncGrpSize may be equal to D4 and the refold ratio be equal to 16, the predetermined arrangement pattern may represent the predetermined arrangement patterns indicated by the various types of shaded areas shown in FIGS. 4-7, and the series of reading patterns may represent the reading patterns of the RAID engine circuit 114R during the series of cycles (e.g. the 0th cycle, the first cycle, etc.) in the embodiment shown in FIG. 8. In another example, EncGrpSize may be equal to D4 and the refold ratio may be equal to 8, the predetermined arrangement pattern may represent the predetermined arrangement patterns indicated by the various types of shaded areas in FIGS. 4-7, and the series of reading patterns may represent the reading patterns of the RAID engine circuit 114R during the series of cycles (e.g. the 0th cycle, the first cycle, etc.) in the embodiment shown in FIG. 9. In another example, EncGrpSize may be equal to D3 and the refold ratio may be equal to 8, the predetermined arrangement pattern may represent the predetermined arrangement patterns indicated by the various types of shaded areas in FIGS. 4-5, and the series of reading patterns may represent the reading patterns of the RAID engine circuit 114R during the series of cycles (e.g. the 0th cycle, the first cycle, etc.) in the embodiment shown in FIG. 11.

In Step S36, the memory controller 110 (e.g. the RAID engine circuit 114R) may read a plurality of symbols from each RAID group of the plurality of RAID groups according to a reading pattern within the series of reading patterns. For better understanding, the cycle of the reading operation of Step S36 may be regarded as a reading cycle (e.g. a certain cycle within the series of cycles (such as the 0th cycle, the first cycle, etc.) of any of the embodiments respectively shown in FIG. 8, FIG. 9 and FIG. 11), and the reading pattern may represent the reading pattern of this reading cycle, but the present invention is not limited thereto. For example, the symbol arrangement of the aforementioned at least one predetermined arrangement pattern may make the symbols that are read in the reading cycle under any circumstance be distributed to different memory elements within the memory elements (e.g. memory access units {U(0), U(1), U(2), U(3), U(4), U(5), U(6), U(7), U(8), U(9), U(10), U(11), U(12), U(13), U(14), U(15)}) of the memory 114V, and the reading pattern may point to the above-mentioned different memory elements. Since the memory elements of the memory 114V may be simultaneously accessed and accessed in parallel, the symbols read in the reading cycle under the circumstance may be simultaneously read, so that reading of the plurality of symbols requires a single cycle only, and more particularly, is completed in the single cycle and does not require a plurality of cycles. Hence, the memory controller 110 (e.g. the RAID engine circuit 114R) can reach optimal performance when performing RAID-related data protection.

In Step S38, the memory controller 110 (e.g. the RAID engine circuit 114R) may perform a bitwise XOR operation upon the plurality of symbols according to the refold mode, in order to convert the plurality of symbols into at least one XOR result corresponding to the RAID group, wherein the aforementioned at least one XOR result may be arranged to perform data protection.

In Step S40, the memory controller 110 (e.g. the RAID engine circuit 114R) may perform RAID protection according to a plurality of XOR results respectively corresponding to the plurality of RAID groups, in order to prevent data errors. For example, the plurality of XOR results may comprise the aforementioned at least one XOR result.

In Step S42, the memory controller 110 (e.g. the microprocessor 112 or the RAID engine circuit 114R) may check whether all symbols in the RAID group have been read, in order to determine whether to stop or continue reading the RAID group. According to this embodiment, when it is determined to continue reading the RAID group, the memory controller 110 (e.g. the RAID engine circuit 114R) may read symbols in the RAID group that have not been read according to a subsequent reading pattern within the series of reading patterns, for providing further data protections. When all symbols in the RAID group are read, Step S44 is entered in order to stop reading the RAID group; otherwise, Step S36 is entered in order to continue reading the RAID group.

In Step S44, the memory controller 110 (e.g. the microprocessor 112 or the RAID engine circuit 114R) may check whether the process is completed. For example, information that is going to be processed comprises a plurality of codewords, and the memory controller 110 may check whether all of the plurality of codewords are processed, wherein one of the plurality of codewords may comprise the plurality of sets of symbols mentioned in Step S30, but the present invention is not limited thereto. When the process is completed, the working flow 300 is closed; otherwise, Step S30 is entered.

According to this embodiment, the memory controller 110 (e.g. the microprocessor 112 or the RAID engine circuit 114R) may write multiple symbols in the plurality of codewords into the memory (e.g. the memory 114V) according to the aforementioned at least one predetermined arrangement pattern to meet various types of requirements and/or to conform to various types of configurations, making the memory controller 110 reach an outstanding performance for performing data protections (e.g. RAID data protections). For example, "the current requirement" mentioned in Step S32 is one of multiple types of requirements (e.g. the various types of requirements, such as data protection requirements corresponding to writing and reading) of the memory device 100, and the memory controller 110 (e.g. the RAID engine circuit 114R) may dynamically adjust the refold mode in response to the types of requirements, and may correspondingly adjust the series of reading patterns. Some description relating to this embodiment which is similar to those for previous embodiments is omitted here for brevity.

According to some embodiments, the memory controller 110 (e.g. the RAID engine circuit 114R) may dynamically adjust the series of reading patterns in response to the types of requirements, wherein the series of reading patterns correspond to a refold mode (e.g. any of the refold modes, such as a refold ratio) related to data protection operations, and the data protection operations are performed by the RAID engine circuit 114R. Some description relating to this embodiment which is similar to those for previous embodiments is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access control in a memory device, the memory device comprising a non-volatile (NV) memory, the NV memory comprising at least one NV memory element, and the method comprising:
   according to at least one predetermined arrangement pattern, writing a plurality of sets of symbols into a plurality of storage regions of a memory as a plurality of redundant array of independent disks (RAID) groups, respectively, in order to provide data protection for accessing the NV memory, wherein the memory is a volatile memory and located in the memory device;
   utilizing a RAID engine circuit in the memory device to determine a series of reading patterns corresponding to the at least one predetermined arrangement pattern according to at least one parameter corresponding to a current requirement, wherein the memory is arranged to provide storage space for the RAID engine circuit; and
   utilizing the RAID engine circuit to simultaneously read a plurality of symbols from each RAID group of the RAID groups according to a reading pattern of the series of reading patterns, and immediately perform exclusive-OR (XOR) operations on the plurality of symbols to generate at least one XOR result, thereby accelerating data protection of said RAID group.

2. The method of claim 1, the step of utilizing the RAID engine circuit to simultaneously read the plurality of symbols from said each RAID group of the RAID groups according to the reading pattern of the series of reading patterns and immediately perform the XOR operations on the plurality of symbols to generate the at least one XOR result thereby accelerating the data protection of said RAID group further comprises:
   utilizing the RAID engine circuit to simultaneously read the plurality of symbols from said each RAID group of the RAID groups in a same reading cycle according to the reading pattern of the series of reading patterns, and immediately perform the XOR operations on the plurality of symbols to generate the at least one XOR result, thereby accelerating the data protection of said RAID group.

3. The method of claim 2, wherein the same reading cycle represents a first reading cycle, the plurality of symbols represents a first group of symbols, the XOR operations represent first XOR operations, and the at least one XOR result represents at least one first XOR result; and the method further comprises:

utilizing the RAID engine circuit to simultaneously read a second group of symbols from said each RAID group of the RAID groups in a second reading cycle according to the reading pattern of the series of reading patterns, and immediately perform second XOR operations on the second group of symbols to generate at least one second XOR result, thereby accelerating the data protection of said RAID group.

4. The method of claim 1, further comprising:

utilizing the RAID engine circuit to determine a refold mode corresponding to the current requirement, wherein the refold mode relates to data protection operations performed by the RAID engine circuit, and the refold mode represents a current operational mode for data; and according to the refold mode, utilizing the RAID engine circuit to determine the series of reading patterns corresponding to the at least one predetermined arrangement pattern.

5. The method of claim 4, wherein the current requirement is one of multiple types of requirements of the memory device, and the method further comprises:

in response to the multiple types of requirements, utilizing the RAID engine circuit to dynamically adjust the refold mode and correspondingly adjust the series of reading patterns.

6. A memory device, comprising:

a non-volatile (NV) memory, arranged to store information, wherein the NV memory comprises at least one NV memory element; and a controller, coupled to the NV memory, the controller arranged to control at least one operation of the memory device, wherein the controller comprises:

a control logic circuit, coupled to the NV memory, the control logic circuit arranged to control the NV memory, wherein the control logic circuit comprises:

a redundant array of independent disks (RAID) engine circuit, arranged to perform data protection; and a memory, arranged to provide storage space for the RAID engine circuit, wherein the memory is a volatile memory; and a processing circuit, coupled to the control logic circuit, the processing circuit arranged to control the controller according to a command from a host device, allowing the host device to access the NV memory via the controller, wherein under control of the processing circuit, the controller performs the following operations:

according to at least one predetermined arrangement pattern, writing a plurality of sets of symbols into a plurality of storage regions of the memory as a plurality of RAID groups, respectively, in order to provide data protection for accessing the NV memory;

utilizing the RAID engine circuit to determine a series of reading patterns corresponding to the at least one predetermined arrangement pattern according to at least one parameter corresponding to a current requirement; and utilizing the RAID engine circuit to simultaneously read a plurality of symbols from each RAID group of the RAID groups according to a reading pattern of the series of reading patterns, and immediately perform exclusive-OR (XOR) operations on the plurality of symbols to generate at least one XOR result, thereby accelerating data protection of said RAID group.

7. The memory device of claim 6, wherein the controller utilizes the RAID engine circuit to simultaneously read the plurality of symbols from said each RAID group of the RAID groups in a same reading cycle according to the reading pattern of the series of reading patterns, and immediately perform the XOR operations on the plurality of symbols to generate the at least one XOR result, thereby accelerating the data protection of said RAID group.

8. The memory device of claim 7, wherein the same reading cycle represents a first reading cycle, the plurality of symbols represents a first group of symbols, the XOR operations represent first XOR operations, and the at least one XOR result represents at least one first XOR result; and the controller utilizes the RAID engine circuit to simultaneously read a second group of symbols from said each RAID group of the RAID groups in a second reading cycle according to the reading pattern of the series of reading patterns, and immediately perform second XOR operations on the second group of symbols to generate at least one second XOR result, thereby accelerating the data protection of said RAID group.

9. The memory device of claim 6, wherein the controller utilizes the RAID engine circuit to determine a refold mode corresponding to the current requirement, wherein the refold mode relates to data protection operations performed by the RAID engine circuit, and the refold mode represents a current operational mode for data; and according to the refold mode, the controller utilizes the RAID engine circuit to determine the series of reading patterns corresponding to the at least one predetermined arrangement pattern.

10. The memory device of claim 9, wherein the current requirement is one of multiple types of requirements of the memory device; and in response to the multiple types of requirements of memory device, the controller utilizes the RAID engine circuit to dynamically adjust the refold mode and correspondingly adjust the series of reading patterns.

11. A controller of a memory device, the memory device comprising the controller and a non-volatile (NV) memory, the NV memory comprising at least one NV memory element, and the controller comprising:

a control logic circuit, coupled to the NV memory, the control logic circuit arranged to control the NV memory, wherein the control logic circuit comprises:

a redundant array of independent disks (RAID) engine circuit, arranged to perform data protection; and a memory, arranged to provide storage space for the RAID engine circuit, wherein the memory is a volatile memory; and a processing circuit, coupled to the control logic circuit, according to a command from a host device, the processing circuit arranged to control the controller in order to allow the host device to access the NV memory via the controller, wherein under control of the processing circuit, the controller performs the following operations:

according to at least one predetermined arrangement pattern, writing a plurality of sets of symbols into a plurality of storage regions of the memory as a plurality of RAID groups, respectively, in order to provide data protection on the NV memory;

utilizing the RAID engine circuit to determine a series of reading patterns corresponding to the at least one predetermined arrangement pattern according to at least one parameter corresponding to a current requirement; and utilizing the RAID engine circuit to simultaneously read a plurality of symbols from each RAID group of the RAID groups according to a reading pattern of the series of reading patterns, and immediately perform exclusive-OR (XOR) operations on the plurality of symbols to generate at least one XOR result, thereby accelerating data protection of said RAID group.

12. The controller of claim 11, wherein the controller utilizes the RAID engine circuit to simultaneously read the plurality of symbols from said each RAID group of the RAID groups in a same reading cycle according to the reading pattern of the series of reading patterns, and immediately perform the XOR operations on the plurality of symbols to generate the at least one XOR result, thereby accelerating the data protection of said RAID group.

13. The controller of claim 12, wherein the same reading cycle represents a first reading cycle, the plurality of symbols represents a first group of symbols, the XOR operations represent first XOR operations, and the at least one XOR result represents at least one first XOR result; and the controller utilizes the RAID engine circuit to simultaneously read a second group of symbols from said each RAID group of the RAID groups in a second reading cycle according to the reading pattern of the series of reading patterns, and immediately perform second XOR operations on the second group of symbols to generate at least one second XOR result, thereby accelerating the data protection of said RAID group.

14. The controller of claim 11, wherein the controller utilizes the RAID engine circuit to determine a refold mode corresponding to the current requirement, wherein the refold mode relates to data protection operations performed by the RAID engine circuit, and the refold mode represents a current operational mode for data; and according to the refold mode, the controller utilizes the RAID engine circuit to determine the series of reading patterns corresponding to the at least one predetermined arrangement pattern.

15. The controller of claim 14, wherein the current requirement is one of multiple types of requirements of the memory device; and in response to the multiple types of requirements, the controller utilizes the RAID engine circuit to dynamically adjust the refold mode and correspondingly adjust the series of reading patterns.

* * * * *